United States Patent
Miller et al.

(10) Patent No.: US 12,459,076 B2
(45) Date of Patent: Nov. 4, 2025

(54) CHEMICAL-MECHANICAL POLISHING SUBPAD HAVING POROGENS WITH POLYMERIC SHELLS

(71) Applicant: CMC Materials, Inc., Aurora, IL (US)

(72) Inventors: Dustin Miller, Beaverton, OR (US); Paul Andre Lefevre, Portland, OR (US); Aaron Peterson, Portland, OR (US); Chen-Chih Tsai, Naperville, IL (US)

(73) Assignee: CMC MATERIALS LLC, Billerica, MA (US)

( * ) Notice: Subject to any disclaimer, the term of this patent is extended or adjusted under 35 U.S.C. 154(b) by 50 days.

(21) Appl. No.: 17/557,461

(22) Filed: Dec. 21, 2021

(65) Prior Publication Data

US 2022/0193860 A1     Jun. 23, 2022

Related U.S. Application Data

(60) Provisional application No. 63/128,953, filed on Dec. 22, 2020.

(51) Int. Cl.
*B24B 37/24* (2012.01)
*B24D 3/32* (2006.01)
*B29C 44/02* (2006.01)

(52) U.S. Cl.
CPC ............. *B24B 37/24* (2013.01); *B24D 3/32* (2013.01); *B29C 44/02* (2013.01)

(58) Field of Classification Search
CPC ........... B24B 37/24; B24B 37/22; B24D 3/32; B29C 44/02
See application file for complete search history.

(56) References Cited

U.S. PATENT DOCUMENTS

| | | | |
|---|---|---|---|
| 2004/0144537 A1* | 7/2004 | Reddy | C04B 20/04 106/676 |
| 2005/0197050 A1* | 9/2005 | Prasad | B24B 37/205 451/41 |
| 2012/0094586 A1 | 4/2012 | Huang et al. | |
| 2013/0137349 A1 | 5/2013 | Lefevre et al. | |
| 2013/0137350 A1 | 5/2013 | Allison et al. | |
| 2014/0357169 A1 | 12/2014 | Murnane et al. | |
| 2015/0325451 A1* | 11/2015 | Mrzyglod | B24D 11/001 438/692 |
| 2015/0367478 A1 | 12/2015 | Lefevre et al. | |
| 2016/0114458 A1 | 4/2016 | Bajaj | |
| 2016/0144477 A1* | 5/2016 | Scott | B24B 37/22 451/538 |

FOREIGN PATENT DOCUMENTS

| | | | |
|---|---|---|---|
| JP | 2005001059 A | 1/2005 | |
| JP | 2010082708 A | 4/2010 | |
| JP | 2016193487 A | 11/2016 | |
| JP | 6076900 B2 | 2/2017 | |
| WO | WO 2012/005778 | * 1/2012 | B24B 37/04 |

OTHER PUBLICATIONS

Korean Intellectual Property Office Acting as ISA, Search Report and Written Opinion of the International Searching Authority issued in connection with Application No. PCT/US2021/064547 on Apr. 13, 2022.

* cited by examiner

*Primary Examiner* — Pegah Parvini

(57) ABSTRACT

A subpad for a chemical-mechanical polishing pad, the subpad having porogens with polymeric shells. Methods of fabricating the subpad and polishing pads with a polishing surface layer bonded to the subpad layer are also described.

8 Claims, 6 Drawing Sheets

CHEMICAL-MECHANICAL POLISHING SUBPAD HAVING POROGENS WITH POLYMERIC SHELLS

TECHNICAL FIELD

This disclosure generally relates to polishing pads used in chemical mechanical planarization, and more specifically to a subpad having porogens with polymeric shells.

BACKGROUND OF THE INVENTION

An integrated circuit is typically formed on a substrate by the sequential deposition of conductive, semi-conductive, and/or insulative layers on a silicon wafer. A variety of fabrication processes require planarization of at least one of these layers on the substrate. For example, for certain applications (e.g., polishing of a metal layer to form vias, plugs, and lines in the trenches of a patterned layer), an overlying layer is planarized until the top surface of a patterned layer is exposed. In other applications (e.g., planarization of a dielectric layer for photolithography), an overlying layer is polished until a desired thickness remains over the underlying layer. Chemical-mechanical planarization (CMP) is one method of planarization. This planarization method typically involves a substrate being mounted on a carrier head. The exposed surface of the substrate is typically placed against a polishing pad on a rotating platen. The carrier head provides a controllable load (e.g., an applied force) on the substrate to push it against the rotating polishing pad. A polishing liquid, such as slurry with abrasive particles, can also be disposed on the surface of the polishing pad during polishing.

A polishing pad may include a top pad, the surface of which contacts the surface being polished during polishing, and a subpad which provides support for the top pad. One objective of a CMP process is to achieve a high polishing uniformity. However, variations in the mechanical properties of polishing pads can result in poor polishing uniformity and/or variations in performance between different batches of CMP pads. Subpads may either have a nonporous or porous structure. Previous approaches to achieving a porous structure in a CMP subpad have various disadvantages. For example, gas-filled pores formed, for instance, through the use chemical or physical blowing agents may have poor uniformity, larger pore sizes than preferred, and/or punctures or tearing in pore walls (e.g., such that adjacent pores become interconnected to form an uncontrolled porous network). These disadvantageous features may result in CMP pads with variable and difficult-to-control mechanical properties, which results in variable and difficult-to-control CMP performance characteristics.

BRIEF DESCRIPTION OF FIGURES

To assist in understanding the present disclosure, reference is now made to the following description taken in conjunction with the accompanying drawings, in which.

DETAILED DESCRIPTION

It should be understood at the outset that, although example implementations of embodiments of the disclosure are illustrated below, the present disclosure may be implemented using any number of techniques, whether currently known or not. The present disclosure should in no way be limited to the example implementations, drawings, and techniques illustrated below. Additionally, the drawings are not necessarily drawn to scale.

This disclosure recognizes that improved control of the properties of the pores formed in a subpad of a CMP pad may provide improved control of mechanical properties and thus improved overall CMP performance. As described herein, a subpad is prepared with porogens that each include a pore (e.g., a pore containing a gas and/or liquid pore filler) surrounded by a polymeric shell. The pore shell material is different than that of the surrounding material of the subpad. During formation of the subpad, the shell prevents flow between pores, resulting in a subpad with a highly controlled and closed pore structure (i.e., with relatively uniform pore size and little or no interconnection between pores) and thus reliable mechanical properties. A variety of new processes are described in this disclosure for preparing these unique subpads and corresponding CMP pads (see FIGS. 5-8 and corresponding description below). For example, subpads can be prepared by mixing polymeric shell pore filler with a liquid polyurethane prepolymer and initiating a polymerization reaction. Molding-based methods can be used to form subpads having porogens with polymeric shells. Alternatively, the subpad may be formed directly on a top pad (e.g., via casting of a mixture containing the subpad precursor components). For casting, the pore filler surrounded by a polymeric shell can be in an expanded or unexpanded state. If an unexpanded pore filler is used, a subsequent expansion step may be performed to achieve an additional decrease in the density of the subpad, which can be further beneficial to CMP performance.

Chemical Mechanical Planarization System

Figure 1:
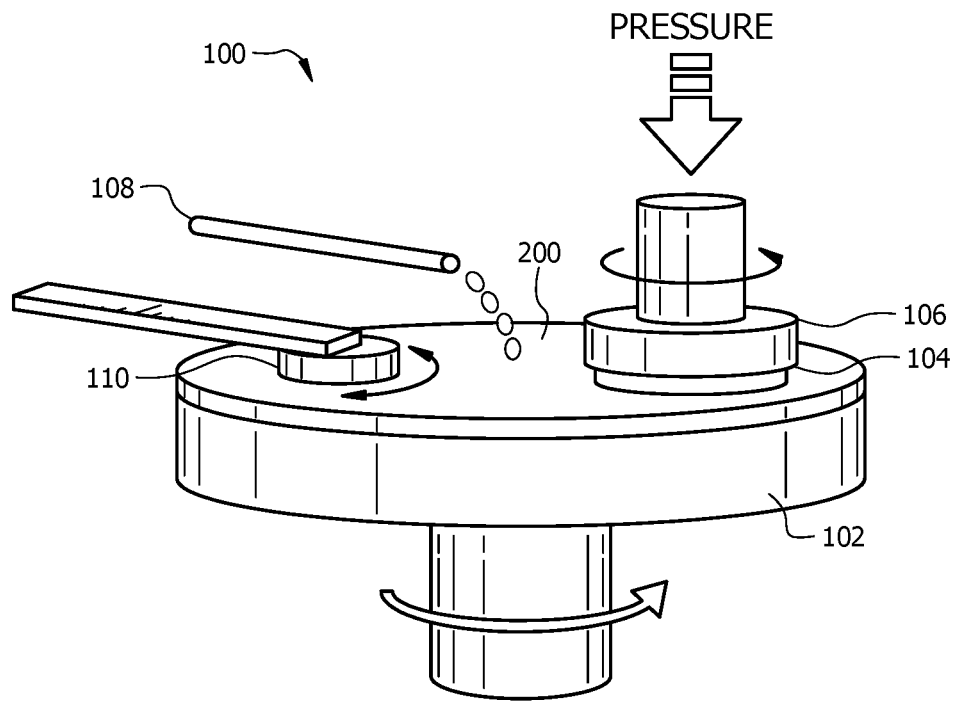
FIG. 1 is a diagram of an example system for chemical mechanical planarization (CMP)

FIG. 1 illustrates a system 100 for performing chemical mechanical planarization. System 100 includes a CMP pad 200 (also referred to as a "polishing pad," see also FIG. 2 and corresponding description below) which is placed on or attached to a platen 102. For example, an adhesive layer (not shown) may be used to attach the polishing pad to the platen 102. The platen 102 can generally be rotated during chemical mechanical planarization. A wafer 104 (e.g., a silicon wafer with or without conductive, semi-conductive, and/or insulative layers, as described above) is attached to a head 106 of a rotatable chuck. The wafer 104 may be attached using vacuum and/or a reversible adhesive (e.g., an adhesive that holds the wafer 104 in place during chemical mechanical planarization but allows the wafer 104 to be removed from the head 106 after chemical mechanical planarization). As illustrated in FIG. 1, a pressure may be applied to the wafer 104 during chemical mechanical planarization (e.g., to facilitate contact between the surface of the wafer 104 and the polishing pad 200).

Figure 2:
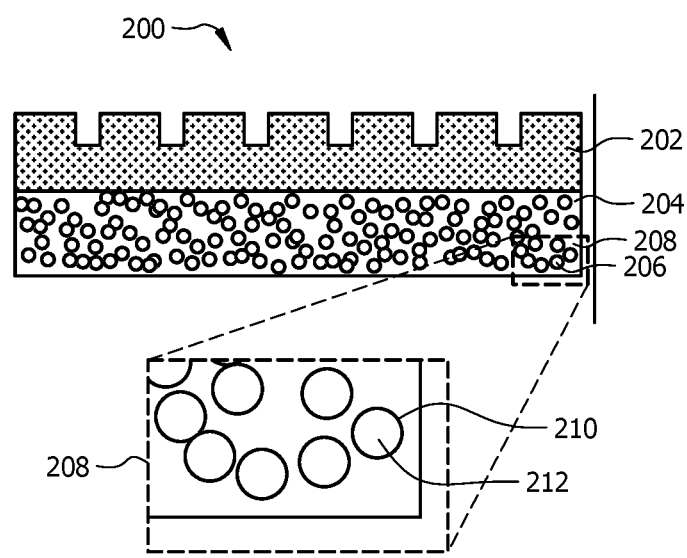
FIG. 2 is a diagram of an example CMP pad including a top pad and a subpad with porogens having polymeric shells.

An example polishing pad 200 are illustrated in FIG. 2 and described in greater detail below. In brief, the polishing pad 200 generally has a circular or approximately cylindrical shape (i.e., with a top surface, a bottom surface, and a curved edge). The polishing pad 200 may comprise polyurethane, such as a flexible polyurethane or a rigid polyurethane. Examples of compositions and methods used to prepare example polishing pads 200 are described in greater detail below. In some embodiments, the compositions include one or more porogens. As illustrated in greater detail in FIG. 2 and described below, the porogens may include a liquid or gas pore surrounded by a polymeric shell. Polishing pad 200 may have any appropriate thickness and any appropriate diameter (e.g., to be employed with a CMP system such as system 100, described above). For instance, the thickness of a polishing pad 200 may be in a range from less than or about 0.5 millimeters (mm) to greater than 5 centimeters (cm). In some embodiments, the thickness of the polishing pad 200 may be in a range from 1 mm to 5 mm. Polishing pad diameter is generally selected to match or be just smaller than, the diameter of the platen 102 of the polishing system 100 used. The polishing pad 200 generally has a uniform or near-uniform thickness (e.g., a thickness that varies by no more than 50%, 25%, 20%, 10%, 5%, or less across the radial extent of the polishing pad).

A slurry 108 may be provided on the surface of the polishing pad 200 before and/or during chemical mechanical planarization. The slurry 108 may be any appropriate slurry for planarization of the wafer type and/or layer material to be planarized (e.g., to remove a silicon oxide layer from the surface of the wafer 104). The slurry 108 generally includes a fluid and abrasive and/or chemically reactive particles. Any appropriate slurry 108 may be used. For example, the slurry 108 may react with one or more materials being removed from a surface being planarized.

A conditioner 110 is a device which is configured to condition the surface of the polishing pad 200. The conditioner 110 generally contacts the surface of the polishing pad 200 and removes a portion of the top layer of the polishing pad 200 to improve its performance during chemical mechanical planarization. For example, the conditioner 110 may roughen the surface of the polishing pad 200.

Example Polishing Pad

FIG. 2 illustrates an example CMP pad 200 in greater detail. The CMP pad 200 includes a top pad 202 and subpad 204. The CMP pad 200 generally has a circular or approximately cylindrical shape. The thickness of the CMP pad 200 may be in a range from about 1 mm to about 10 mm or more. The diameter of the CMP pad 200 may be in a range from about 500 mm to about 800 mm. The CMP pad 200 generally has a uniform thickness. A uniform thickness is defined as a thickness that varies by no more than 50%, 25%, 20%, 10%, 5%, or less across the radial extent of the pad. In other words, the thickness measured near the center of the pad 200 is substantially the same as the thickness near the edge of the pad 200.

The top pad 202 may be a polyurethane material, such as a thermoset polyurethane, or any other appropriate material. As illustrated by the side-view depiction of FIG. 2, the top pad 202 may include grooves or any other appropriate structure or pattern for facilitating CMP. For instance, grooves may facilitate the transport of etched material and/or any other products of the CMP process away from the surface of the top pad 202 and the wafer 104 being planarized. The top pad 202 may have any appropriate thickness. For example, the thickness of the top pad 202 may be in a range from about 0.2 mm to about 5 mm.

The subpad 204 may be a polyurethane material, such as a thermoset polyurethane. The subpad 204 may have any appropriate thickness. For example, the thickness of the subpad 204 may be in a range from about 0.2 mm to about 5 mm. The subpad 204 generally includes porogens 206 distributed within the body of the subpad 204. The density of the subpad 204 with porogens 206 is generally in a range from about 450 kg/m$^3$ to about 900 kg/m$^3$. The density of porogens 206 may be in a range from about 0.010 kg/m$^3$ to about 0.10 kg/m$^3$. The porogen density generally corresponds to the mass of porogens (e.g., the mass of gas and/or liquid within the pore 212) per volume of the body of the subpad 204. In some embodiments, the density of the subpad 204 with porogens 206 is in a range from about 450 kg/m$^3$ to about 800 kg/m$^3$. The density and amount of the porogens 206 may be tuned to provide desired mechanical properties to the subpad 204 and the CMP pad 200.

As illustrated in the expanded view 208 of the subpad 204, each of the porogens 206 includes a pore 212 surrounded by a polymeric shell 210. The pore 212 of each porogen 206 may contain or be filled with a gas or a mixture of gas and liquid. For example, the pore 212 may include or be filled with one or more of n-pentane, iso-pentane, butane, and/or iso-butane. The polymeric shells 210 may be any appropriate material for stabilizing the porogens 206 during preparation of the subpad 204. In some embodiments, the polymeric shells 210 include a block copolymer, polyvinylidene chloride, acrylonitrile, and/or one or more acrylic materials. In some embodiments, the porogens 206 have an average pore size (e.g., diameter) of about 5 micrometers to about 100 micrometers. In some embodiments, the porogens have an average pore size (e.g., diameter) of about 15 micrometers to about 50 micrometers.

The presence of the polymeric shells 210 helps to prevent rupture of and interconnection between pores within the subpad 204. For example, at least in part because of the presence of the polymeric shells 210, greater than 99% of the porogens 206 in a subpad 204 may have a closed cell structure (i.e., such that there is no interconnectivity with other pores 212 and that the gas and/or liquid within a given pore 212 cannot move into another pore 212). The presence of the polymeric shells 210 may also help to facilitate a narrower size distribution of the porogens 206 than was previously possible and thus an improved control over the mechanical properties of the subpad 204.

The benefits of the new subpad 204 described above provide for improved control of the mechanical properties and CMP performance of the CMP pad 200. For example, the subpad 204 may have a compression force deflection (CFD) of about 25% between 5 psi and 200 psi (e.g., a 25% decrease in volume over this pressure range). The hardness of the subpad 204 may be in a range from about 10 Shore A to about 90 Shore A. The damping, or tan delta, of the subpad 204 may be in a range from about 0.02 and about 0.50. The elastic modulus (E') of the subpad 204 may be in range from about 0.1 MPa to about 400 MPa.

The top pad 202 and the subpad 204 may be held together with or without an adhesive to form the CMP pad 200. For example, in cases where an adhesive is used, the top pad 202 may be secured to the subpad 204 by a thin adhesive layer (e.g., a layer of pressure-sensitive adhesive). Other adhesives may also or alternatively be used as appropriate. For example, the adhesive may be a hot-melt adhesive, or the polishing portion and backing portion may be connected by laminating a thin layer of a thermoplastic material between the top pad 202 subpad 204. A platen adhesive may be used to secure the CMP pad 200 to the platen 102 illustrated in FIG. 1 in order to perform CMP.

Thermal Stability of Example Polishing Pads

Figure 3:
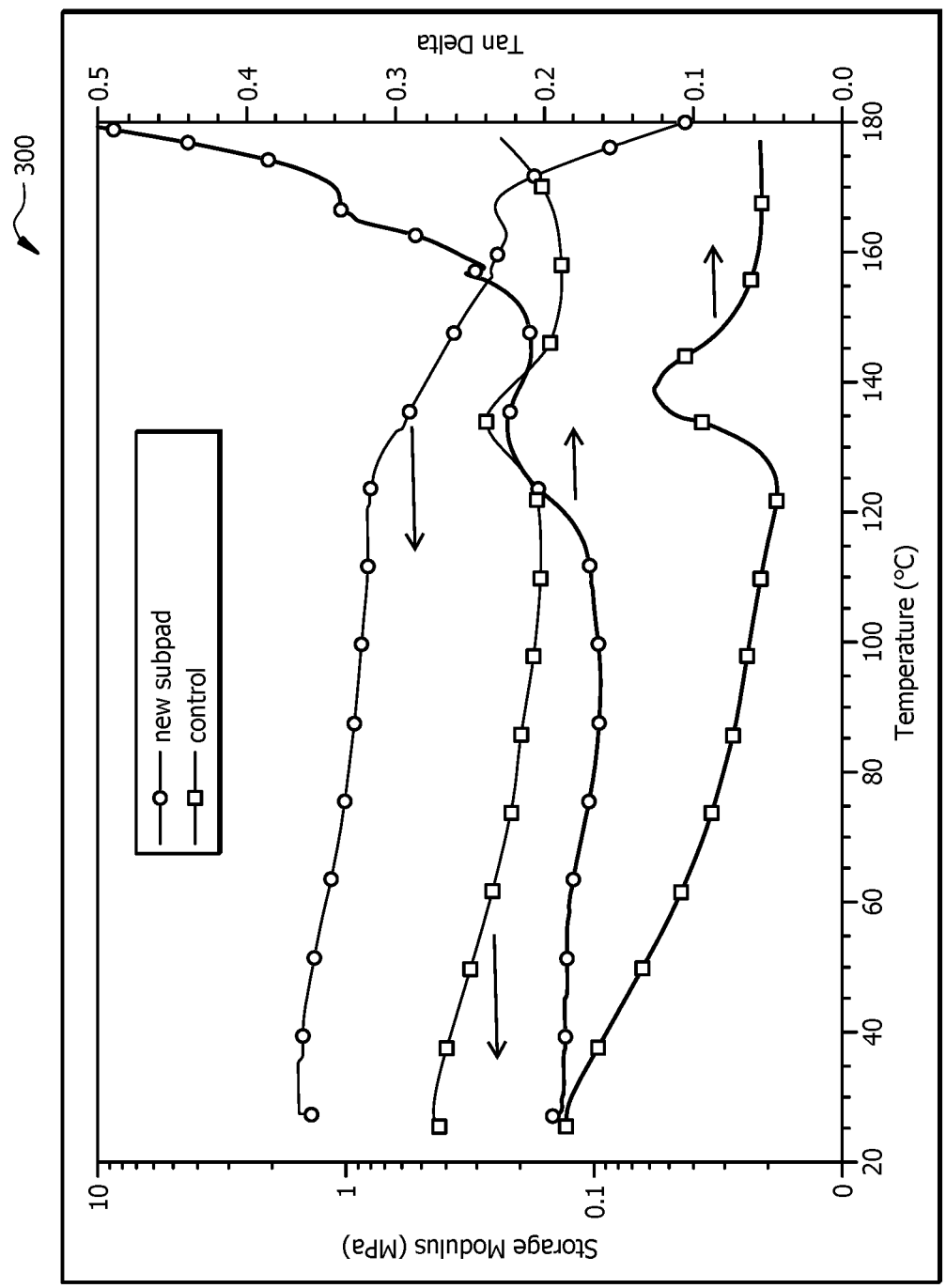
FIG. 3 is a plot of storage modulus versus temperature demonstrating the thermal stability of example CMP pads prepared as described in this disclosure.

FIG. 3 is a plot 300 of storage modulus and tan delta values versus temperature for example CMP pads. Plot 300 demonstrates that a CMP pad prepared with the subpad with porogens 206 having polymeric shells 210 (circle markers in FIG. 3) is more thermally stable than a previous subpad (square markers in FIG. 3) in the temperature range from 25° C. to 100° C. that is commonly experienced during CMP. The storage modulus (left y-axis) of the control sample is lower and undergoes a relatively large change in this temperature range, while the new subpad maintains a larger and relatively more stable storage modulus from 25° C. to 100° C. The tan delta (right y-axis) of the control sample decreases a relatively large amount from about 0.13 to 0.02 over this temperature range, while the new subpad maintains a more stable tan delta value from 25° C. to 100° C.

Removal Rate Performance of Example Polishing Pads

This example illustrates two inventive subpads having porogens with polymeric shells made by the processes described herein, and a comparison in removal rate performance to commercial subpads.

Two separate subpads were produced using porogens having different sizes but both having polymeric shells. Subpad A was produced using a porogen having an average size of 20 microns and a polymeric shell (Nouryon Expancel expanded with 20 micrometer diameter). Subpad B was produced using a porogen having an average pore size of 40 microns and a polymeric shell (Nouryon Expancel expanded with 40 micrometer diameter).

The inventive subpads were produced by mixing the porogens having polymeric shells with a liquid polyurethane prepolymer to achieve a mass-to-volume ratio of 0.77 for Subpad A and 0.65 for Subpad B. The resulting mixtures were each transferred into molds containing a top pad (E6088 top pad, CMC Materials Inc.) held in place with the grooved surface facing down, on a vacuum rotation platen. Using a spin casting method The platen has the liquid polyurethane prepolymer mixture containing the porogen was dispensed on the back side of the top pad while the platen was rotating. The polymerization of the the liquid polyurethane prepolymer mixture containing the porogen was initiated by heating the mixture with an infra-red heater while the platen was still rotating. Following polymerization, the resulting pads comprising the top pad bonded to the respective subpad were removed from the mold and analyzed for the parameters described below.

The Compression Force Deflection (CFD) was measured using known methods. For increased resolution, a Dynamic Mechanical Analysis (DMA) Instrument was used to create stress strain curve in compression mode. The CFD was taken at a 2% strain (compressibility deflection). The subpad hardness measurements were done using a Shore A durometer.

TABLE 1

Parameters for two subpads having porogens with polymeric shells.

| Parameter | Unit | Subpad A | Subpad B |
|---|---|---|---|
| Subpad Density | g/cc | 0.77 | 0.65 |
| Subpad Thickness | millimeter | 1.5 | 1.5 |
| Subpad Compression Force Deflection (CFD) at 2% deflection | kPa | 100 | 20 |
| Subpad Hardness | Shore A | 71 | 47 |
| Porogen size | micrometer | 20 | 40 |
| Porogen density | g/cc | 0.07 | 0.03 |
| Process | | Spin Casting over molding on top pad back side | Spin Casting over molding on top pad back side |

The parameters in the table above illustrate two types of subpads that can be made with porogens having polymeric shells according to the present invention. Both subpads were formed by a spin casting over molding process on the back side of a E6088 top pad.

Figure 4A:
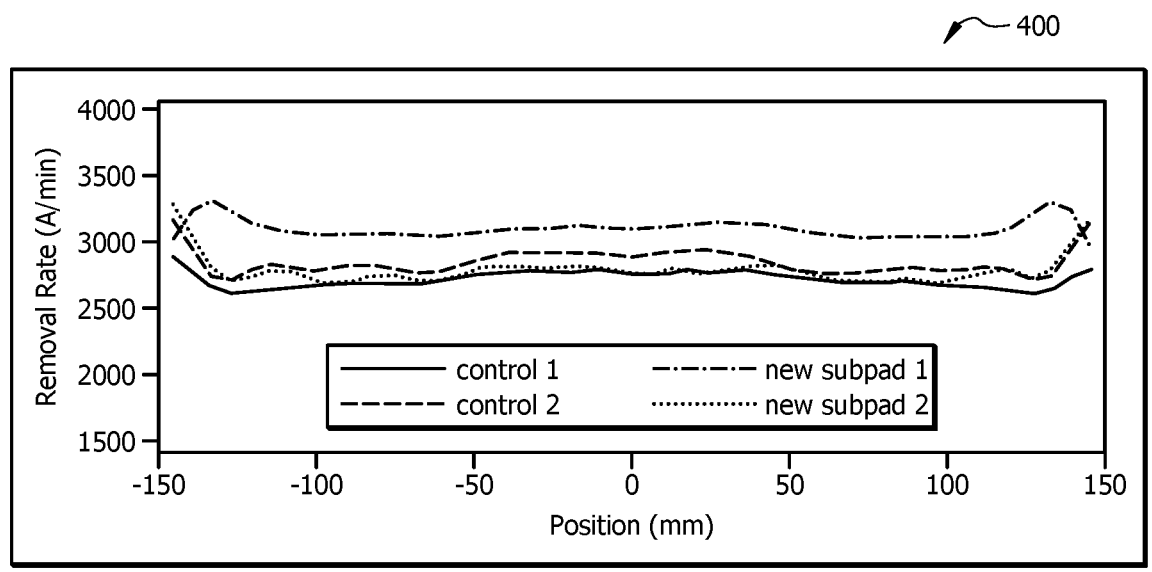
FIGS. 4A and 4B are plots of removal rate for wafers polished using various CMP pads, including CMP pads prepared using processes described in this disclosure.
Figure 4B:
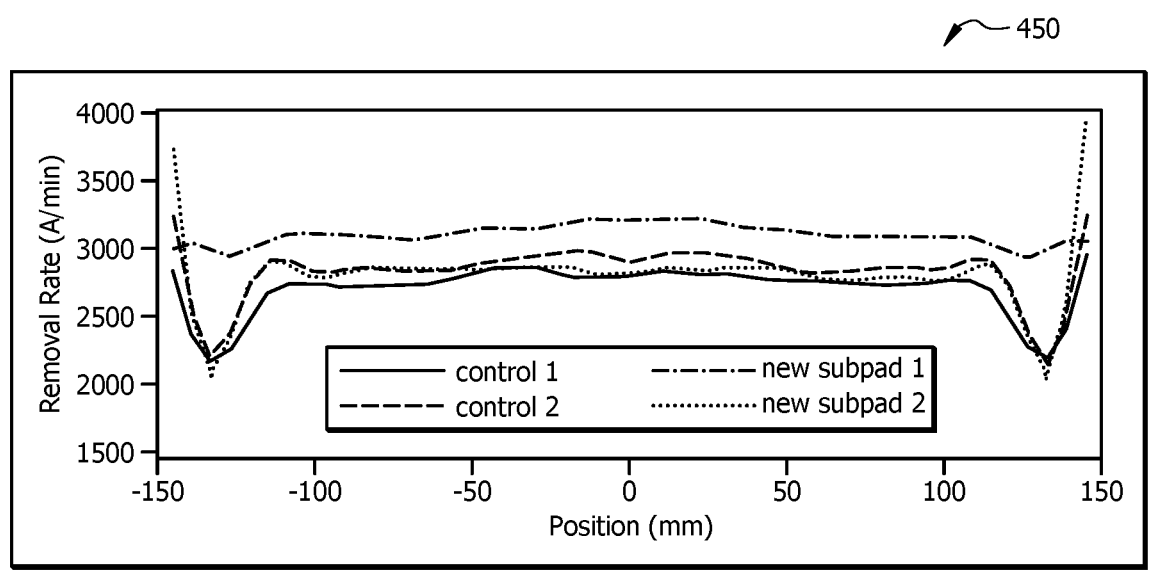

FIGS. 4A and 4B show plots 400 and 450, respectively, of removal rate profiles (i.e., removal rate as a function of radial position on the polished wafer) achieved by the inventive CMP pads having porogens with polymeric shells (Subpad A described above) and by commercially available polishing pads (E6088 with foamed subpads containing semi-closed cell structures and laminated to an E6088 top pad). Control 1 represents a pad having a hard subpad, while Control 2 represents a pad having a soft subpad. Therefore, all four pads were constructed using identical E6088 top pad material attached to different subpads (two control pads with previously available subpads and two pads with the new subpad having porogens with polymeric shells, as described in this disclosure). These CMP pads were tested under two different polishing conditions, and the results are shown in FIGS. 4A and 4B.

FIG. 4A shows removal rate profiles achieved by each CMP pad using a standard "flat" pressure profile where a uniform downward force is applied to the wafer during polishing. The control pads (Control 1 and 2) exhibit an increased removal rate at the edge of the wafer. This can result in overpolishing and/or damage at the edge of a wafer during polishing. The CMP pad with new subpad 1 (subpad A described above) achieves a different removal profile with decreased removal rate near the edges, while the CMP pad with new subpad 2 performs similarly to the previous subpads (Controls 1 and 2).

FIG. 4B shows removal rate profiles achieved by each CMP pad using a reduced downward pressure at the edge of the wafer being polished. For control pads 1 and 2, this altered pressure distribution near the edge of the wafer causes increased variability in the removal rate near the edge of the wafer. However, the CMP pad with new subpad 1 (subpad A described above) has a relatively flat removal rate profile under these test conditions. Thus, this new CMP pad with a subpad having porogens with polymeric shells displays improved etching uniformity under these test conditions.

Methods of Preparing and Using Subpads and CMP Pads

Figure 5:
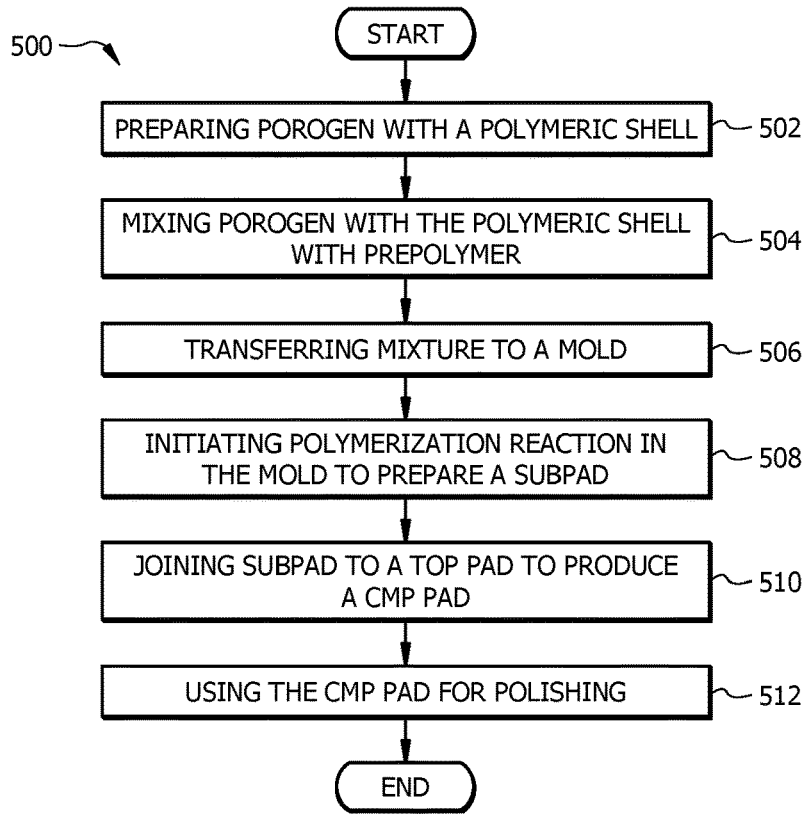
FIG. 5 is a flow diagram of an example method of preparing and using a subpad which includes porogens having polymeric shells, according to certain embodiments of this disclosure.

FIG. 5 illustrates an example process 500 for preparing a subpad 204 and a CMP pad 200 and using the CMP pad 200, according to an illustrative embodiment of the present disclosure. In this example, a mixture is prepared which includes the porogens 206 with the polymeric shell 210 at step 502. For example, the porogens 206 with the polymeric shells 210 may be prepared by mixing a prepolymer of the polymeric shells 210 with a pore filler (e.g., a gas and/or liquid) in a solvent, agitating this mixture, and initiating polymerization of the prepolymer of the polymeric shells 210 to form the porogens 206. As another example, the porogens 206 with the polymeric shells 210 may be prepared by mixing a polymer of the polymeric shells 210 with a pore filler (e.g., a gas and/or liquid) in a solvent and agitating this mixture to form the porogens 206. Preparation of porogens 206 may include the addition of a surfactant with a particle stabilizer. Examples of such particle stabilizers include silica and magnesium particles.

At step 504, the porogens 206 with the polymeric shells 210 are mixed with a prepolymer of the subpad 204 (e.g., a liquid polyurethane prepolymer). For example, the porogens 206 may be mixed with the subpad prepolymer at an appropriate mass-to-volume ratio to achieve a subpad density in a range from about 150 kg/m$^3$ to about 900 kg/m$^3$ (e.g., or from about 450 kg/m$^3$ to about 900 kg/m$^3$). In some embodiments, the porogens 206 with the polymeric shells 210 are formed in the subpad prepolymer. For example, components (e.g., gas and/or liquid pore filler) which reside within the pores 212 and the prepolymer (e.g., or the polymer) of the polymer shells 212 may be mixed with the subpad prepolymer. The mixture may be appropriately mixed or agitated to aid in forming the porogens 206 within the prepolymer of the subpad 204. In some cases, the porogens 206 with the polymeric shells 210 are mixed with the prepolymer of the subpad 204 (e.g., a liquid polyurethane prepolymer) along with a curing agent and/or additional additives, such as softening agents. The addition of the curing agent and/or other additives may begin the chemical polymerization of the prepolymer of the subpad 204.

At step 506, the resulting mixture from step 504 may be transferred into a mold. The mold may have an "inverse" shape of the desired shape of the subpad 204. In some embodiments, the mixture from step 504 is not placed in a mold (see, e.g., the method 600 of FIG. 6, described below). For instance, in some embodiments, the subpad 204 may be formed directly on the top pad 202 (e.g., via casting, or the like, as described with respect to step 606 of FIG. 6 below).

At step 508, the polymerization of the prepolymer is initiated to prepare the subpad 204 with the porogens 206 having polymeric shells 210. In some embodiments, the prepolymer is thermally polymerized (e.g., via exposure to an appropriate temperature for an appropriate period of time). More generally, the polymerization reaction may involve exposure to one or more of appropriate temperature/ thermal conditions, polymerization agents, and/or light of an appropriate wavelength and/or intensity.

At step 510, the subpad obtained at step 508 may be joined to a top pad 202 (e.g., with or without the use of an adhesive) in order to prepare a CMP pad 200. Joining of the top pad 202 and subpad 204 at step 510 can be achieved with or without an adhesive. In some cases, an adhesive may be disposed on one or both of the top pad 202 and the subpad 204 to join the top pad 202 and subpad 204 to form the CMP pad 200. In some cases, the materials may adhere to each other without an adhesive. In some cases, a polymeric mixture may be disposed onto a surface of the subpad 204 (e.g., using an extrusion process or a reaction injection molding process), and polymerization of the polymeric mixture (e.g., based on exposure to appropriate thermal conditions, polymerization agents, and/or light of an appropriate wavelength and/or intensity) may be initiated after the top pad 202 and subpad 204 are placed in contact in order to join the top pad 202 to the subpad 200.

At step 512, the CMP pad from step 510 the CMP pad is used for chemical mechanical planarization. For example, the CMP pad 200 may be used in the system 100 described above with respect to FIG. 1.

Figure 6:
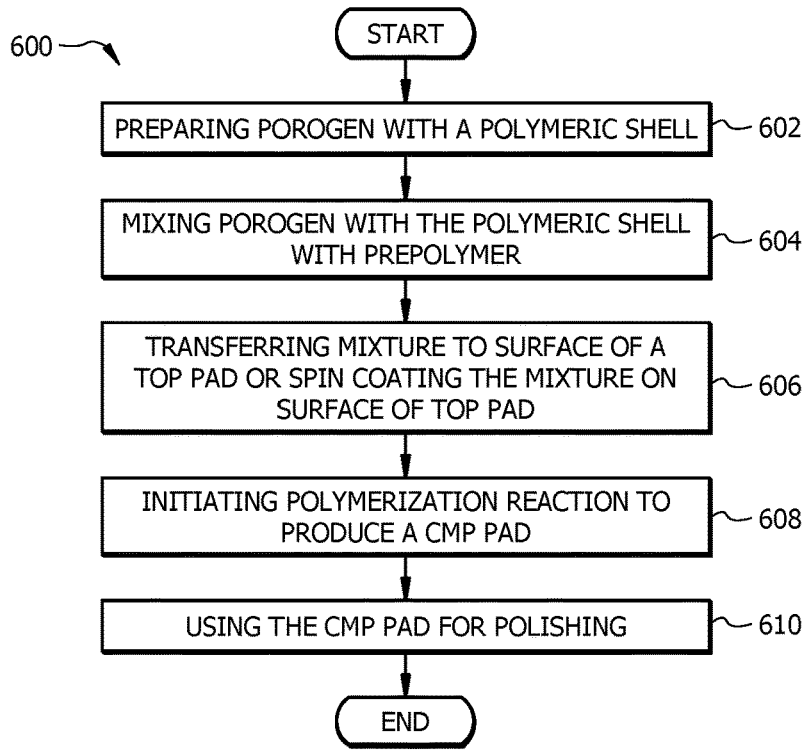
FIG. 6 is a flow diagram of another example method of preparing and using a subpad which includes porogens having polymeric shells, according to certain embodiments of this disclosure.

FIG. 6 illustrates another example process 600 for preparing a subpad 204 and a CMP pad 200 and using the CMP pad 200, according to an illustrative embodiment of the present disclosure. In this example, a mixture is prepared which includes the porogens 206 with the polymeric shell 210 at step 602. For example, the porogens 206 with the polymeric shells 210 may be prepared by mixing a prepolymer of the polymeric shells 210 with a pore filler (e.g., a gas and/or liquid) in a solvent, agitating this mixture, and initiating polymerization of the prepolymer of the polymeric shells 210 to form the porogens 206. As another example, the porogens 206 with the polymeric shells 210 may be prepared by mixing a polymer of the polymeric shells 210 with a pore filler (e.g., a gas and/or liquid) in a solvent and agitating this mixture to form the porogens 206. Preparation of porogens 206 may include the addition of a surfactant with a particle stabilizer. Examples of such particle stabilizers include silica and magnesium particles At step 604, the porogens 206 with the polymeric shells 210 are mixed with a prepolymer of the subpad 204 (e.g., a liquid polyurethane prepolymer). For example, the porogens 206 may be mixed with the subpad prepolymer at an appropriate mass-to-volume ratio to achieve a subpad density in a range from about 150 kg/m$^3$ to about 900 kg/m'. In some embodiments, the subpad density is in a range from about 450 kg/m$^3$ to about 900 kg/m$^3$. In some embodiments, the porogens 206 with the polymeric shells 210 are formed in the subpad prepolymer. For example, components (e.g., gas and/or liquid pore filler) which reside within the pores 212 and the prepolymer (e.g., or the polymer) of the polymer shells 212 may be mixed with the subpad prepolymer. This mixture may be appropriately mixed or agitated to aid in forming the porogens 206 within the prepolymer of the subpad 204. In some cases, the porogens 206 with the polymeric shells 210 are mixed with the prepolymer of the subpad 204 (e.g., a liquid polyurethane prepolymer) along with a curing agent and/or additional additives, such as softening agents. The addition of the curing agent and/or other additives may begin the chemical polymerization of the prepolymer of the subpad 204.

At step 606, the resulting mixture from step 604 may be transferred to the surface of the top pad 202. In some embodiments, the mixture from step 604 is transferred to the surface of the top pad 202 by spin coating the mixture onto the top pad 202. The rate at which the spin coating is performed (e.g., in rotations per minute) may be adjusted to achieve a desired thickness of the mixture on the surface of the top pad 202 such that the resulting subpad 204 is a desired thickness. In some embodiments, the mixture from step 604 is transferred to the surface of the top pad 202 using an extrusion process. In some embodiments, the mixture from step 604 is transferred to the surface of the top pad 202 using another method such as drop coating or the like. In some embodiments, the mixture from step 604 is deposited onto the surface of a top pad 202 using an additive manufacturing method, such as 3D printing. In some embodiments, the subpad material is dispensed using an additive manufacturing method. The top pad material is then be dispensed onto the subpad 204 using an additive manufacturing method.

At step 608, the polymerization of the prepolymer is initiated to prepare the subpad 204 with porogens 206 having polymeric shells 210. In some embodiments, the prepolymer is thermally polymerized (e.g., via exposure to an appropriate temperature for an appropriate period of time). More generally, the polymerization reaction may involve exposure to one or more of appropriate temperature/thermal conditions, polymerization agents, and/or light of an appropriate wavelength and/or intensity. The subpad 204 adheres to the top pad 202 following the polymerization process, thereby forming the CMP pad 200.

At step 610, the CMP pad from step 608 the CMP pad is used for chemical mechanical planarization. For example, the CMP pad 200 may be used in the system 100 described above with respect to FIG. 1.

Figure 7:
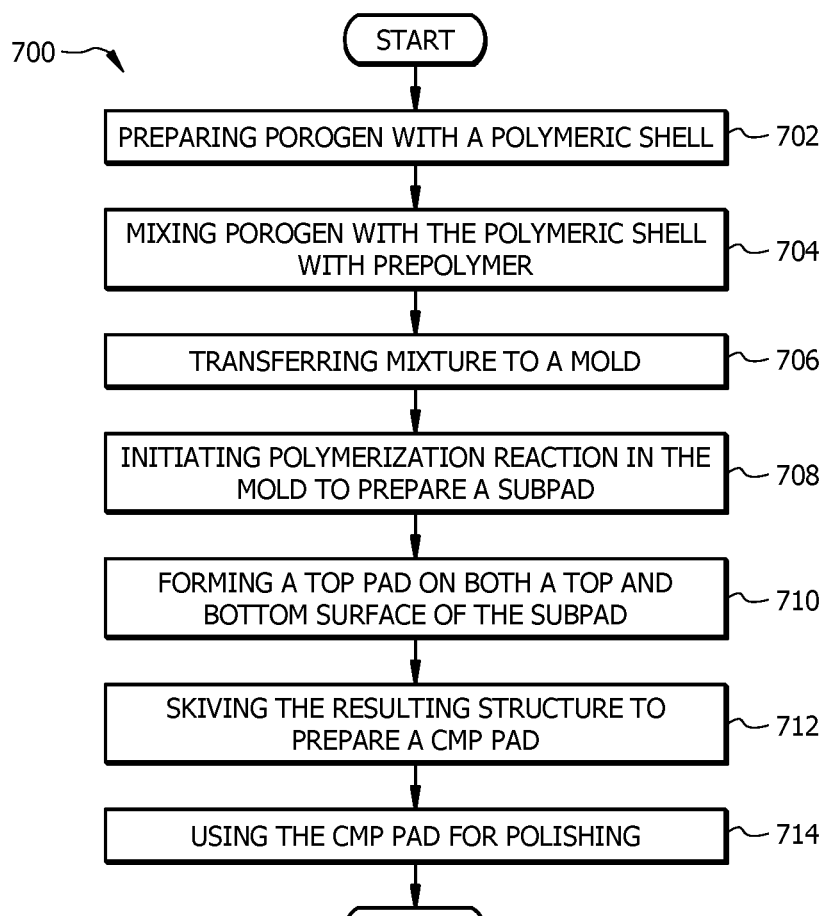
FIG. 7 is a flow diagram of yet another example method of preparing and using a subpad which includes porogens having polymeric shells, according to certain embodiments of this disclosure.

FIG. 7 illustrates an example process 700 for preparing a subpad 204 and a CMP pad 200 and using the CMP pad 200, according to an illustrative embodiment of the present disclosure. In example method 700 skiving is used to prepare CMP pads 200 from a multilayer structure (see FIG. 8 for a further exemplary illustration). In this example, a mixture is prepared which includes the porogens 206 with the polymeric shell 210 at step 702. For example, the porogens 206 with the polymeric shells 210 may be prepared by mixing a prepolymer of the polymeric shells 210 with a pore filler (e.g., a gas and/or liquid) in a solvent, agitating this mixture, and initiating polymerization of the prepolymer of the polymeric shells 210 to form the porogens 206. As another example, the porogens 206 with the polymeric shells 210 may be prepared by mixing a polymer of the polymeric shells 210 with a pore filler (e.g., a gas and/or liquid) in a solvent and agitating this mixture to form the porogens 206. Preparation of porogens 206 may include the addition of a surfactant with a particle stabilizer. Examples of such particle stabilizers include silica and magnesium particles At step 704, the porogens 206 with the polymeric shells 210 are mixed with a prepolymer of the subpad 204 (e.g., a liquid polyurethane prepolymer). For example, the porogens 206 may be mixed with the subpad prepolymer at an appropriate mass-to-volume ratio to achieve a subpad density in a range from about 150 kg/m$^3$ to about 900 kg/m$^3$. The density of porogens 206 in the subpad 204 may be in a range from about 0.010 kg/m$^3$ to about 0.10 kg/m$^3$. In some embodiments, the porogens 206 with the polymeric shells 210 are formed in the subpad prepolymer. For example, components (e.g., gas and/or liquid pore filler) which reside within the pores 212 and the prepolymer (e.g., or the polymer) of the polymer shells 212 may be mixed with the subpad prepolymer. This mixture may be appropriately mixed or agitated to aid in forming the porogens 206 within the prepolymer of the subpad 204.

At step 706, the resulting mixture from step 704 may be transferred into a mold. The mold may have an "inverse" shape of the desired shape of the subpad 204. In some embodiments, the mixture from step 704 is not placed in a mold (see, e.g., the method 600 of FIG. 6, described below). For instance, in some embodiments, the subpad 204 may be formed directly on the top pad 202 (e.g., via casting, or the like, as described with respect to step 606 of FIG. 6 below).

At step 708, the polymerization of the prepolymer is initiated to prepare the subpad 204 with the porogens 206 having polymeric shells 210. In some embodiments, the prepolymer is thermally polymerized (e.g., via exposure to an appropriate temperature for an appropriate period of time). More generally, the polymerization reaction may involve exposure to one or more of appropriate temperature/thermal conditions, polymerization agents, and/or light of an appropriate wavelength and/or intensity.

Figure 8:
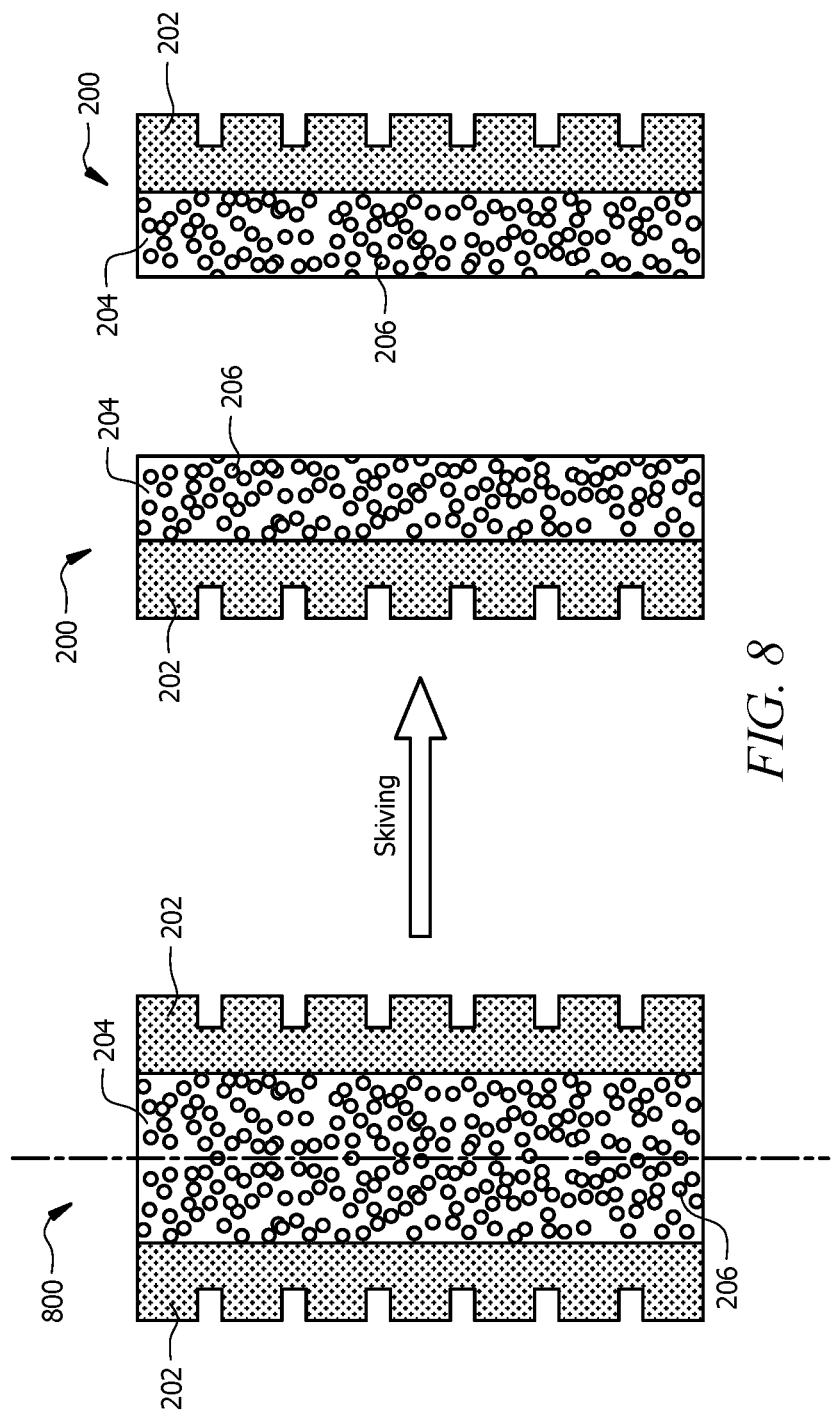
FIG. 8 is a diagram illustrating the preparation of the CMP pad of FIG. 2 using skiving (e.g., using the example method of FIG. 7).

At step 710, a top pad 202 is joined to the top and bottom surface of the subpad 204 from step 708 in order to prepare a multilayer structure. FIG. 8 depicts an example of such a multilayer structure 800. Multilayer structure 800 includes a subpad 204 with top pads 202 attached to both the top and bottom surface of the subpad 204. Joining of the top pads 202 and subpad 204 at step 710 can be achieved with or without an adhesive. In some cases, an adhesive may be disposed on one or both of the top pads 202 and the subpad 204 to join the top pads 202 and subpad 204 to form the multilayer structure 800 illustrated in FIG. 8. In some cases, the materials of the top pads 202 and subpad 204 may adhere to each other without an adhesive. While the example of method 700 describes forming the subpad 204 in a mold (see steps 706 and 708), it should be understood that the subpad may be formed directly on one of the top pads 202 (e.g., as described with respect to steps 606 and 608 of FIG. 6 above). In such cases, the other top pad 202 may be attached to the remaining exposed surface of the joined sub pad 204 to form the multilayer structure 800 of FIG. 8.

At step 712, skiving is performed to separate (e.g., cut) the multilayer structure 800 into two CMP pads 200, as illustrated in FIG. 8. Skiving involves cutting along the length of the subpad 202 (e.g., approximately near the middle of the subpad 204, as illustrated in FIG. 8). Skiving may be performed at or near the center of the subpad 204, the center of the multilayer structure 800, or at any appropriate location along the depth of the subpad 204 (e.g., to form CMP pads 200 with the same subpad thickness or different subpad thicknesses). At step 714, a CMP pad 200 from step 712 is used for chemical mechanical planarization. For example, the CMP pad 200 may be used in the system 100 described above with respect to FIG. 1.

Using one of the processes 500, 600, or 700 described above, a CMP pad 200 can be produced with a subpad 204 that has a more uniform and controlled pore structure than is possible using previous technology. The processes described in this disclosure (e.g., with respect to FIGS. 5, 6, and 7) also facilitate the preparation of CMP pads with controlled mechanical properties at low cost and with a range of thicknesses. The controlled and smaller pore sizes of the subpad 204 described in this disclosure generally provide improved etching performance (see FIG. 4B). It should be appreciated, that steps of one or more of the example processes described with respect to FIGS. 5, 6, and 7 may be combined to prepare a CMP 200 with at least certain of the features and benefits described in this disclosure.

Modifications, additions, or omissions may be made to the systems, apparatuses, and methods described herein. The components of the systems and apparatuses may be integrated or separated. Moreover, the operations of the systems and apparatuses may be performed by more, fewer, or other components. The methods may include more, fewer, or other steps. Additionally, steps may be performed in any suitable order. Additionally, operations of the systems and apparatuses may be performed using any suitable logic. As used in this document, "each" refers to each member of a set or each member of a subset of a set.

Herein, "or" is inclusive and not exclusive, unless expressly indicated otherwise or indicated otherwise by context. Therefore, herein, "A or B" means "A, B, or both,"

unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. The use of any and all examples, or exemplary language (e.g., "such as") provided herein, is intended merely to better explain the disclosure and does not pose a limitation on the scope of claims.

The invention claimed is:

1. A chemical-mechanical polishing pad comprising:
    a subpad supporting a top pad, the subpad comprising a thermoset polyurethane body and a plurality of porogens distributed within the thermoset polyurethane body, the porogens comprising polymeric shells wherein the polymeric shells comprise a material selected from the group consisting of a block copolymer, polyvinylidene chloride, acrylonitrile, and acrylic materials, wherein the subpad has a density of about 150 kg/m$^3$ to about 900 kg/m$^3$ and a compression force deflection of about 25% between 5 psi and 200 psi; and
    a top pad having a polishing surface, wherein the top pad is adhered to the subpad with an adhesive.

2. The chemical mechanical polishing pad of claim 1, wherein the porogens have an average pore size of about 5 micrometers to about 100 micrometers.

3. The chemical mechanical polishing pad of claim 2, wherein the porogens have an average pore size of about 15 micrometers to about 50 micrometers.

4. The subpad of claim 1, wherein the density of the subpad is about 450 kg/m$^3$ to about 800 kg/m$^3$.

5. The chemical mechanical polishing pad of claim 1, wherein the porogens are filled with gas or a mixture of gas and liquid.

6. The chemical mechanical polishing pad of claim 5, wherein the porogens are filled with one or more materials selected from the group consisting of n-pentane, iso-pentane, butane, and iso-butane.

7. The chemical mechanical polishing pad of claim 1, wherein greater than 99% of the porogens are closed cells.

8. The chemical mechanical polishing pad of claim 1, wherein the hardness is about 10 Shore A to about 90 Shore A, the tan delta is between about 0.02 and about 0.5, the elastic modulus (E') is about 0.1 MPa to about 400 MPa, and/or the thickness is about 0.2 mm to about 5 mm.

* * * * *